United States Patent
Kim

(10) Patent No.: US 7,525,953 B2
(45) Date of Patent: Apr. 28, 2009

(54) METHOD OF ESTABLISHING COMMUNICATION LINK IN ADSL SYSTEM

(75) Inventor: Yong-woon Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 893 days.

(21) Appl. No.: 11/033,211

(22) Filed: Jan. 11, 2005

(65) Prior Publication Data
US 2005/0180336 A1  Aug. 18, 2005

(30) Foreign Application Priority Data
Feb. 13, 2004  (KR) ...................... 10-2004-0009627

(51) Int. Cl.
H04L 12/66 (2006.01)
(52) U.S. Cl. ..................................... 370/352
(58) Field of Classification Search ........................ None
See application file for complete search history.

(56) References Cited

U.S. PATENT DOCUMENTS

2002/0061059 A1 * 5/2002 Ginesi ...................... 375/219
2004/0085987 A1 * 5/2004 Gross et al. ................. 370/430
2004/0202237 A1 * 10/2004 Krinsky et al. .............. 375/222

FOREIGN PATENT DOCUMENTS

| EP | 1109328 B1 | 2/2004 |
| JP | 2001-237747 | 8/2001 |
| KR | 03-20740 | 3/2003 |
| KR | 03-70115 | 8/2003 |

* cited by examiner

Primary Examiner—Wing F Chan
Assistant Examiner—Hicham B Foud
(74) Attorney, Agent, or Firm—Mills & Onello, LLP

(57) ABSTRACT

In a method of establishing a communication link in an ADSL system, a bit masking operation is performed on errors occurring in initialization messages of message tones and backup tones used to transmit/receive the initialization messages. Errors of one of the initialization messages of the message tones and the backup tones of which the errors are bit-masked are corrected. A cyclic redundancy check operation is performed on the initialization message having the corrected errors. Link establishment or link failure is determined based on the result of the cyclic redundancy check. Since some portion of errors of the initialization messages are removed in advance of a cyclic redundancy check operation, it is possible to stably perform a link establishment process.

9 Claims, 6 Drawing Sheets

FIG. 3
(PRIOR ART)

| | DOWNSTREAM CHANNEL | | | | | | | UPSTREAM CHANNEL | | |
|---|---|---|---|---|---|---|---|---|---|---|
| | AS 0 | AS 1 | AS 2 | AS 3 | LS 0 | LS 1 | LS 2 | LS 0 | LS 1 | LS 2 |
| BF 1 | 0X0028 | 0X0000 | 0X0000 | 0X0000 | 0X0000 | 0X0000 | 0X0000 | 0X0013 | 0X0000 | 0X0000 |
| BI 1 | 0X0000 | 0X0000 | 0X0000 | 0X0000 | 0X0000 | 0X0000 | 0X0000 | 0X0008 | 0X0000 | 0X0000 |
| RRSI 1 | 0X0000 | 0X0000 | 0X0001 | 0X0001 | 0X0000 | 0X0000 | 0X0000 | 0X0001 | 0X0001 | 0X0000 |
| BF 2 | 0X0027 | 0X0000 | 0X0001 | 0X0000 | 0X0040 | 0X0000 | 0X0000 | 0X0013 | 0X0000 | 0X0000 |
| BI 2 | 0X0000 | 0X0000 | 0X0000 | 0X0000 | 0X0000 | 0X0000 | 0X0010 | 0X0000 | 0X0000 | 0X0000 |
| RRSI 2 | 0X0000 | 0X0000 | 0X0001 | 0X0001 | 0X0000 | 0X0000 | 0X0000 | 0X0001 | 0X0001 | 0X0000 |
| BF3 | 0X0022 | 0X0000 | 0X0000 | 0X0000 | 0X0000 | 0X0000 | 0X0000 | 0X0013 | 0X0000 | 0X0000 |
| BI 3 | 0X0000 | 0X0000 | 0X0000 | 0X0000 | 0X0000 | 0X0000 | 0X0000 | 0X0000 | 0X0000 | 0X0000 |
| RRSI 3 | 0X0000 | 0X0000 | 0X0001 | 0X0001 | 0X0000 | 0X0000 | 0X0004 | 0X0001 | 0X0001 | 0X0000 |
| BF 4 | 0X001C | 0X0000 | 0X0000 | 0X0000 | 0X0000 | 0X0000 | 0X0000 | 0X0013 | 0X0000 | 0X0000 |
| BI 4 | 0X0000 | 0X0000 | 0X0000 | 0X0000 | 0X0000 | 0X0000 | 0X0000 | 0X0000 | 0X0000 | 0X0000 |
| RRSI 4 | 0X0000 | 0X0000 | 0X0001 | 0X0001 | 0X0000 | 0X0000 | 0X0000 | 0X0001 | 0X0001 | 0X0000 |
| CRC | 0X0028 | 0X0072 | 0X0000 | | 0X001F | 0X0060 | 0X005F | 0X0012 | | |
| MSG/CRC | 0X0000 | 0X0000 | 0X0000 | 0X0000 | | | | | | |

C_RATESRA: rows BF 1 through RRSI 4 and CRC
C_MSGRA: row MSG/CRC

FIG. 4
(PRIOR ART)

| | DOWNSTREAM CHANNEL | | | | | | | | UPSTREAM CHANNEL | | |
|---|---|---|---|---|---|---|---|---|---|---|---|
| | AS 0 | AS 1 | AS 2 | AS 3 | LS 0 | LS 1 | LS 2 | | LS 0 | LS 1 | LS 2 |
| BF 1 | 0X0028 | 0X0000 | 0X0000 | 0X0000 | 0X0000 | 0X0000 | 0X0000 | | 0X0013 | 0X0000 | 0X0000 |
| BI 1 | 0X0000 | 0X0000 | 0X0000 | 0X0000 | 0X0000 | 0X0000 | 0X0000 | | 0X0008 | 0X0000 | 0X0000 |
| RRSI 1 | 0X0000 | 0X0000 | 0X0001 | 0X0001 | 0X0000 | 0X0000 | 0X0000 | | 0X0001 | 0X0001 | 0X0000 |
| BF 2 | 0X0027 | 0X0000 | 0X0001 | 0X0000 | 0X0000 | 0X0000 | 0X0000 | | 0X0013 | 0X0000 | 0X0000 |
| BI 2 | 0X0000 | 0X0000 | 0X0000 | 0X0000 | 0X0000 | 0X0000 | 0X0000 | | 0X0000 | 0X0000 | 0X0000 |
| RRSI 2 | 0X0000 | 0X0000 | 0X0001 | 0X0001 | 0X0000 | 0X0000 | 0X0000 | | 0X0001 | 0X0000 | 0X0000 |
| BF3 | 0X0022 | 0X0000 | 0X0000 | 0X0000 | 0X0000 | 0X0000 | 0X0000 | | 0X0013 | 0X0000 | 0X0000 |
| BI 3 | 0X0000 | 0X0000 | 0X0000 | 0X0001 | 0X0000 | 0X0000 | 0X0000 | | 0X0000 | 0X0000 | 0X0000 |
| RRSI 3 | 0X0000 | 0X0000 | 0X0001 | 0X0000 | 0X0000 | 0X0002 | 0X0000 | | 0X0001 | 0X0001 | 0X0000 |
| BF 4 | 0X001C | 0X0000 | 0X0000 | 0X0001 | 0X0000 | 0X0000 | 0X0000 | | 0X0013 | 0X0000 | 0X0000 |
| BI 4 | 0X0000 | 0X0000 | 0X0000 | 0X0000 | 0X0000 | 0X0000 | 0X0000 | | 0X0001 | 0X0000 | 0X0000 |
| RRSI 4 | 0X0000 | 0X0000 | 0X0001 | 0X0001 | 0X0000 | 0X0000 | 0X0000 | | 0X0001 | 0X0001 | 0X0000 |
| CRC | 0X0018 | 0X0072 | | 0X0000 | 0X001F | 0X0060 | 0X005F | | 0X0075 | | |
| MSG/CRC | 0X0000 | 0X0000 | 0X0000 | 0X0000 | | | | | | | |

{ C_RATESRA = BF 1 through RRSI 4 rows
{ C_MSGRA = CRC and MSG/CRC rows

FIG. 6

| | DOWNSTREAM CHANNEL | | | | | | | UPSTREAM CHANNEL | | |
|---|---|---|---|---|---|---|---|---|---|---|
| | AS 0 | AS 1 | AS 2 | AS 3 | LS 0 | LS 1 | LS 2 | LS 0 | LS 1 | LS 2 |
| BF 1 | 0X0028 | 0X0000 | 0X0000 | 0X0000 | 0X0000 | 0X0000 | 0X0000 | 0X0013 | 0X0000 | 0X0000 |
| BI 1 | 0X0000 | 0X0000 | 0X0000 | 0X0000 | 0X0000 | 0X0000 | 0X0000 | 0X0000 | 0X0000 | 0X0000 |
| RRSI 1 | 0X0000 | 0X0000 | 0X0000 | 0X0001 | 0X0000 | 0X0000 | 0X0000 | 0X0001 | 0X0001 | 0X0000 |
| BF 2 | 0X0027 | 0X0000 | 0X0000 | 0X0000 | 0X0000 | 0X0000 | 0X0000 | 0X0013 | 0X0000 | 0X0000 |
| BI 2 | 0X0000 | 0X0000 | 0X0000 | 0X0000 | 0X0000 | 0X0000 | 0X0000 | 0X0000 | 0X0000 | 0X0000 |
| RRSI 2 | 0X0000 | 0X0000 | 0X0001 | 0X0000 | 0X0000 | 0X0000 | 0X0000 | 0X0001 | 0X0001 | 0X0000 |
| BF 3 | 0X0022 | 0X0000 | 0X0000 | 0X0000 | 0X0000 | 0X0000 | 0X0000 | 0X0013 | 0X0000 | 0X0000 |
| BI 3 | 0X0000 | 0X0000 | 0X0000 | 0X0000 | 0X0000 | 0X0000 | 0X0000 | 0X0000 | 0X0000 | 0X0000 |
| RRSI 3 | 0X0000 | 0X0000 | 0X0001 | 0X0001 | 0X0000 | 0X0002 | 0X0000 | 0X0001 | 0X0001 | 0X0000 |
| BF 4 | 0X001C | 0X0000 | 0X0000 | 0X0000 | 0X0000 | 0X0000 | 0X0000 | 0X0013 | 0X0000 | 0X0000 |
| BI 4 | 0X0000 | 0X0000 | 0X0000 | 0X0000 | 0X0000 | 0X0000 | 0X0000 | 0X0000 | 0X0000 | 0X0000 |
| RRSI 4 | 0X0000 | 0X0000 | 0X0001 | 0X0001 | 0X0000 | 0X0000 | 0X0000 | 0X0001 | 0X0001 | 0X0000 |
| CRC | 0X0048 | 0X0072 | | | | | | | | |
| MSG/CRC | 0X0000 | 0X0000 | 0X0000 | 0X0000 | 0X001F | 0X0060 | 0X005F | 0X0075 | | |

C_RATESRA: BF 1 through CRC rows
C_MSGRA: MSG/CRC row

FIG. 7

| (Kbps) | Test Loop | 1 | | 4 | | 5 | |
|---|---|---|---|---|---|---|---|
| Spec. | Noise | Length | Actual | Length | Actual | Length | Actual |
| 512 | FA | 2700 | 1312 | 900 | 1504 | 1500 | 1504 |
| 768 | FA | 2650 | 1504 | 850 | 1696 | 1450 | 1696 |
| 1024 | FA | 2600 | 1664 | 800 | 1952 | 1400 | 1920 |
| 1544 | FA | 2450 | 2336 | 650 | 2592 | 1250 | 2560 |
| 512 | FB | 2950 | 1408 | 1150 | 1568 | 1750 | 1536 |
| 768 | FB | 2900 | 1632 | 1100 | 1760 | 1700 | 1696 |

…

METHOD OF ESTABLISHING COMMUNICATION LINK IN ADSL SYSTEM

RELATED APPLICATIONS

This application claims the priority of Korean Patent Application No. 2004-9627, filed on Feb. 13, 2004, in the Korean Intellectual Property Office, the disclosure of which is incorporated herein in its entirety by reference.

BACKGROUND OF THE INVENTION

1. Field of the Invention

The present invention relates to an asymmetric digital subscriber line (ADSL) system, and more particularly, to a method of establishing a communication link in the ADSL system.

2. Description of the Related Art

An asymmetric digital subscriber line (ADSL) system generally comprises a central office (CO) such as a telephone office and customer premises equipment (CPE). The CO and the CPE may include their own corresponding ADSL modems.

In order to establish a communication link in the ADSL system, the following initialization process is performed during a boot operation of the ADSL modem.

Phase locking is initially obtained by a phase locked loop (PLL) in response to an initial pilot tone output from the CO. An equalizer and echo canceller are subjected to learning or training in response to a reception reverb signal, which is a cyclic signal output from the CO.

Next, a signal-to-noise ratio (SNR) of the ADSL system is calculated in response to a medley signal output from the CO. An appropriate downstream data rate is determined based on the calculated SNR. The determined downstream data rate is transmitted from the CPE to the CO. An upstream data rate is similarly determined using the same method as the method for determining the downstream data rate. The upstream data rate is transmitted from the CO to the CPE.

A process for exchanging initialization messages including the data rates is performed in a 4 quadrature amplitude modulation (QAM) system using 4 message transfer tones (hereinafter, referred to as a "message tone") and 4 associated backup tones. The backup tones have the same initialization messages as the message tones. Each of the initialization messages comprises 2-byte cyclic redundancy checking (CRC) messages.

On the other hand, the message tones and the backup tones may be affected by noise such as a high bit-rate DSL (HDSL) crosstalk and European Telecommunication Standards Institute (ETSI) FA/FB/FC/FD crosstalk.

The ETSI 388 test specification is a European standard specification. In the test specification, 8 types of test loops are specified. In addition, it is specified that the desired test rate is generated by applying the ETSI FA/FB/FC/FD crosstalk to the test loops while increasing the lengths of the test loops.

If the ETSI FA or FB crosstalk is applied to the test loops and the lengths of the test loops increase, the process for establishing the communication link in the ADSL may not be successful. For example, in a case where the ADSL system modem attempts to perform the process for establishing the communication link on a test loop of 26 American wire gauge (AWG) having a length of 2950 m by using an European standard ADSL annex B mode, if the ETSI FB crosstalk is applied to the test loop, the process for establishing the communication link in the ADSL system may not be successful. In addition, in a case where the ADSL modem attempts to perform the process for establishing the communication link on a test loop of 26 AWG having a length of more than 2950 m by using the ADSL annex B mode, if the ETSI FA crosstalk is applied to the test loop, the process for establishing the communication link in the ADSL system may not be successful.

FIG. 1 depicts the HDSL crosstalk that occurs in an American standard ADSL annex A mode. Referring to FIG. 1, a frequency response of the HDSL crosstalk is depicted.

As shown in FIG. 1, noise power of the HDSL crosstalk is relatively large in the low frequency band. Since noise such as the HDSL crosstalk affects the message tones and the backup tones in the low frequency band, errors may occur in the initialization message transmitted or received through the message tones and the backup tones. In turn, the erroneous initialization messages may generate a link failure in the ADSL system.

FIG. 2 depicts the ETSI FB crosstalk that occurs in a European standard ADSL annex B mode. Referring to FIG. 2, a frequency response of the ETSI FB crosstalk is depicted. Locations of the message tones and the associated backup tones in the ADSL annex B mode are indicated by A and B.

Similar to the HDSL crosstalk shown in FIG. 1, noise power of the ETSI FB crosstalk is also relatively large in a low frequency band. Therefore, as described above, the erroneous initialization messages may generate link failures in the ADSL system. In other words, in the ADSL system of the ADSL annex B mode, as shown in FIG. 2, since the initialization messages (for example, C_RATESRA, C_MSGRA, CRATES2, C_MSG2, and C_B&G) and the CRC messages associated with the initialization messages are transmitted in the 4 QAM system using the 75-th to 78-th message tones and the 91-th to 94-th backup tones in the low frequency band, a large number of errors in the initialization message occur due to the ETSI FB crosstalk, so that a link failure may be generated. In addition, since an ADSL system of the T1.413 annex A mode utilizes the 37-th to 40-th backup tone in a lower frequency band, the backup tones may be further affected by a crosstalk such as the ETSI FB crosstalk. Therefore, a large number of errors in the initialization messages occur due to the crosstalk, so that it may be impossible to correct the errors.

FIG. 3 is a table illustrating an example of C_RATESRA and C_MSGRA messages in the message tones in which errors occur due to the ETSI FB crosstalk. FIG. 4 is a table illustrating an example of transmitted/received C_RATESRA and C_MSGRA messages in the backup tones in which errors occur due to the ETSI FB crosstalk, wherein the transmitted/received C_RATESRA and C_MSGRA messages correspond to the transmitted/received messages in the message tones shown in FIG. 3.

Referring to FIGS. 3 and 4, there are listed C_RATESRA and C_MSGRA messages of the initialization messages generated in the case where ETSI FB crosstalk is applied to the ETSI test loop 1 having a length of 2950 m.

In the tables shown in FIG. 3 and 4, "0X" at each cell denotes hexadecimal. The C_RATESRA and C_MSGRA messages have 2-byte CRC messages at their own end portions. The C_RATESRA and C_MSGRA messages are transmitted in a fast mode of operation of the ADSL system. A frame contained in each of the messages has 1-byte information.

As shown in FIGS. 3 and 4, the C_RATESRA and C_MSGRA messages transmitted/received by the message tones and the backup tones have a large number of errors due to the crosstalk. The errors take the form of different data values that are received during respective transmissions of the same data using the message tones (FIG. 3) and the backup tones (FIG.

4). Even though the initialization messages of the message tones and the backup tones are compared and checked in this manner, it is impossible to determine which of the tones comprise the initialization messages having a small number of errors. Therefore, the process for establishing the communication link in the ADSL will not be successful due to the large amount of errors. These errors, which lead to link failures, are indicated in the tables of FIGS. 3 and 4 as shaded cells.

SUMMARY OF THE INVENTION

The present invention provides a method of establishing a communication link in an ADSL system in a stable manner, by reducing errors in the initialization messages that occur due to noise such as crosstalk.

According to an aspect of the present invention, there is provided a method of establishing a communication link in an ADSL system using a bearer channel and latency mode when transmitting/receiving initialization messages and transmitting/receiving the initialization messages by using message tones and backup tones. The method comprises: (a) performing a bit masking operation on errors occurring in initialization messages of the message tones and the backup tones; (b) correcting errors of one of the initialization messages of the message tones and backup tones of which the errors are bit-masked in the step (a); (c) performing a cyclic redundancy check operation on the initialization message having the corrected errors; and (d) determining link establishment or link failure of the communication link on which the initialization messages are transmitted based on the result of the cyclic redundancy check of the step (c).

The method may further comprise a step (e) of detecting bit-masked errors of the initialization messages in the message tones and the backup tones by using a predetermined logic operation, and utilizing the number of the detected errors as a repetition number of the cyclic redundancy check operation of the step (c).

In the method, the logic operation of the step (e) may include an exclusive-OR operation. In addition, in the method, the errors in the step (a) may occur due to a crosstalk or noise on the communication link.

In the method, in a case where the number of the errors detected in the step (e) is 3, at least one error out of the three errors may be changed by the error correction performed in the step (b).

In the method, the initialization messages corrected in the step (b) may be initialization messages having a few errors.

In the method, the step (a) may comprise a step of receiving the initialization message from the message tones and the backup tones.

In the method, the step (e) may comprise: (e1) counting the number of the detected errors and setting the number to a count value; and (e2) setting a reference count value to zero.

In the method, the step (d) may comprise: (d1) determining whether the number of the errors obtained by the cyclic redundancy check operation is zero; (d2) when the number of the errors obtained by the cyclic redundancy check operation is determined to be zero in the step (d1), asserting that there is a link establishment in the ADSL system; (d3) when the number of the errors obtained by the cyclic redundancy check operation is determined to be not zero in the step (d1), determining whether the reference count value is smaller than the set count value; (d4) when the reference count value is determined to be not smaller than the set count value in the step (d3), asserting that there is a link failure in the ADSL system; (d5) when the reference count value is smaller than the set count value in the step (d3), determining whether time associated with the set count value is longer than a link initialization time; (d6) when the time associated with the set count value is determined to be longer than the link initialization time in the step (d5), proceeding to the step (d4) to assert that there is a link failure in the ADSL system; and (d7) when the time associated with the set count value is determined to be not longer than the link initialization time in the step (d5), increasing the reference count value by one and providing the increased count value to the step (b).

According to the method of establishing a communication link in an ADSL system of the present invention, since some portion of errors of initialization messages are removed by performing a bit masking operation on errors occurring in initialization messages of the message tones and the backup tones and correcting errors of one of the initialization messages of the message tones and the backup tones of which errors are bit-masked in advance of a cyclic redundancy check operation, it is possible to stably perform a link establishment, or set-up, process.

BRIEF DESCRIPTION OF THE DRAWINGS

The above and other features and advantages of the present invention will become more apparent by describing in detail exemplary embodiments thereof with reference to the attached drawings in which:

FIG. 3 is a table illustrating an example of C_RATESRA and C_MSGRA messages in the message tones in which errors occur due to a particular form of crosstalk;

FIG. 4 is a table illustrating an example of transmitted/received C_RATESRA and C_MSGRA messages in the backup tones in which errors occur due to a particular form of crosstalk, wherein the transmitted/received C_RATESRA and C_MSGRA messages in the backup tones of FIG. 4 correspond to the transmitted/received messages in the message tones shown in FIG. 3;

FIG. 6 is a table illustrating transmitted/received messages generated when a bit masking step according to the present invention is performed on the transmitted/received messages shown in FIG. 4; and FIG. 7 is a table that illustrates test results obtained in a case where a method of establishing a communication link in an ADSL system according to the present invention is applied to test loops according to the ETSI 388 annex B test specification.

DETAILED DESCRIPTION OF PREFERRED EMBODIMENTS

Figure 1:
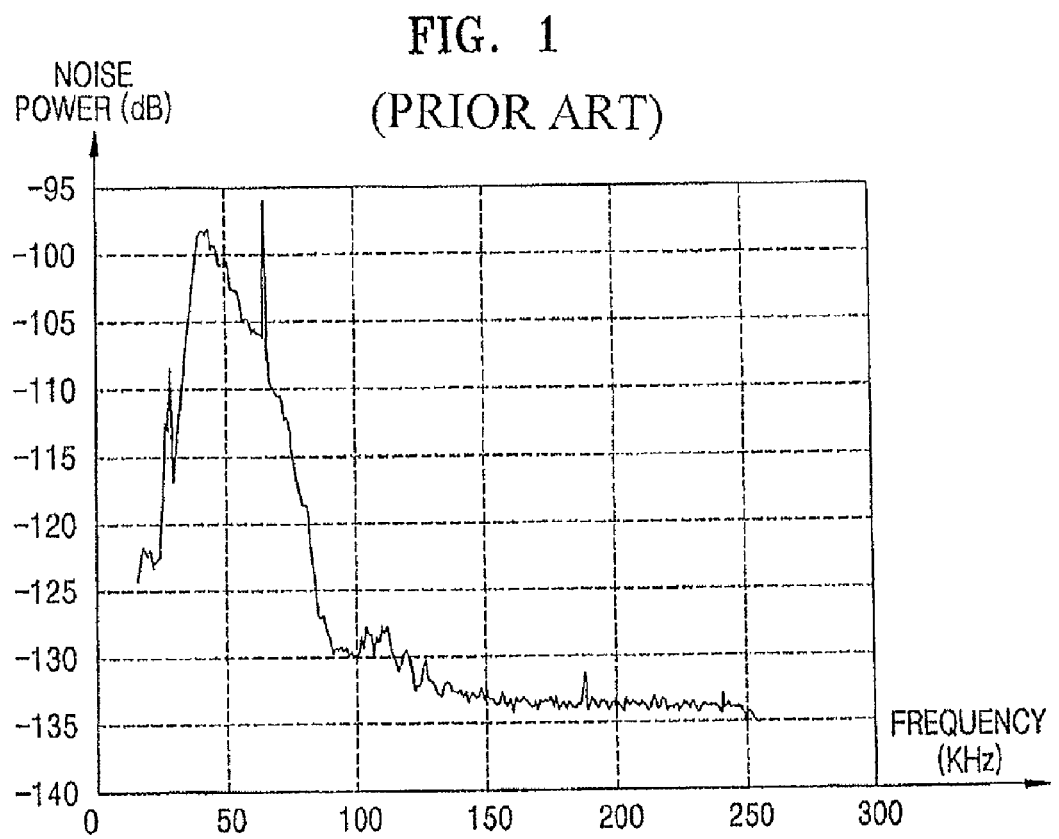
FIG. 1 is a chart that depicts the occurrence of HDSL crosstalk in an American standard ADSL annex A mode.
Figure 2:
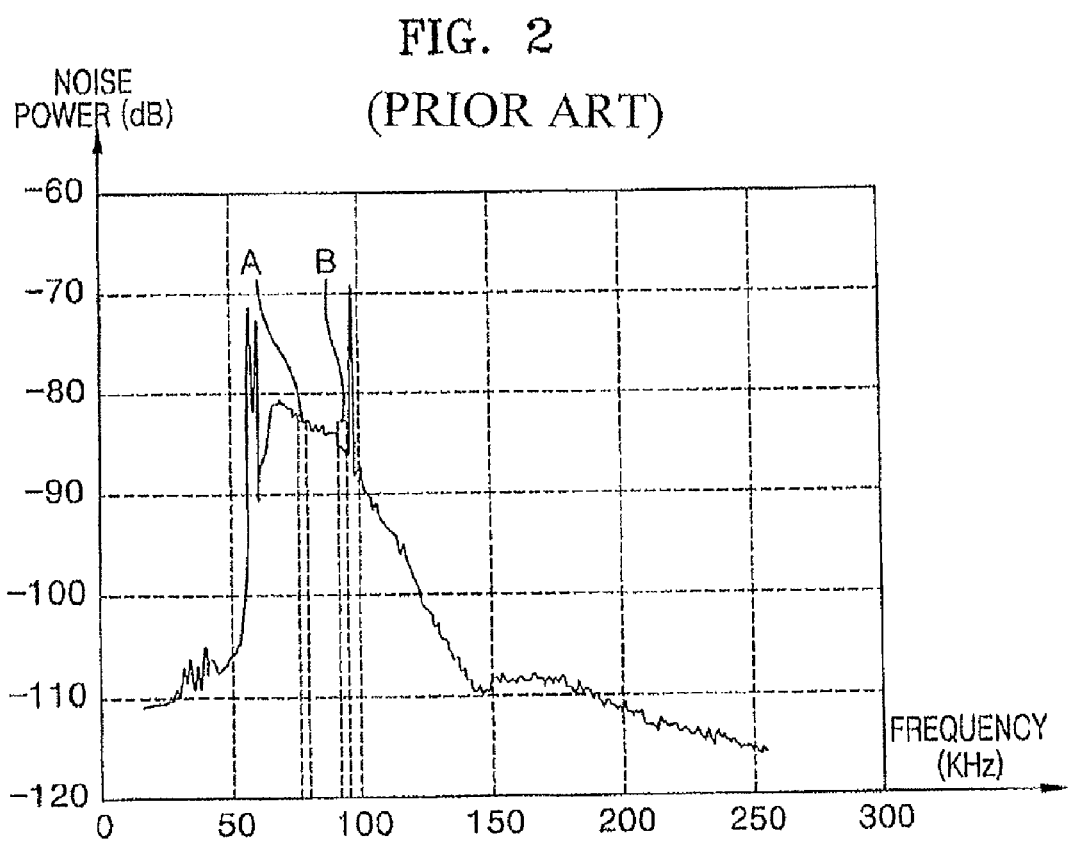
FIG. 2 is a chart that depicts the occurrence of ETSI FB crosstalk occurring in a European standard ADSL annex B mode.

The present invention and operational advantages thereof can be fully understood by referring to the accompanying drawings and explanations thereof. Now, exemplary embodiments of the present invention will be described with reference to the accompanying drawings to explain the present invention in detail. In the drawings, the same reference numerals refer to the same elements.

Figure 5:
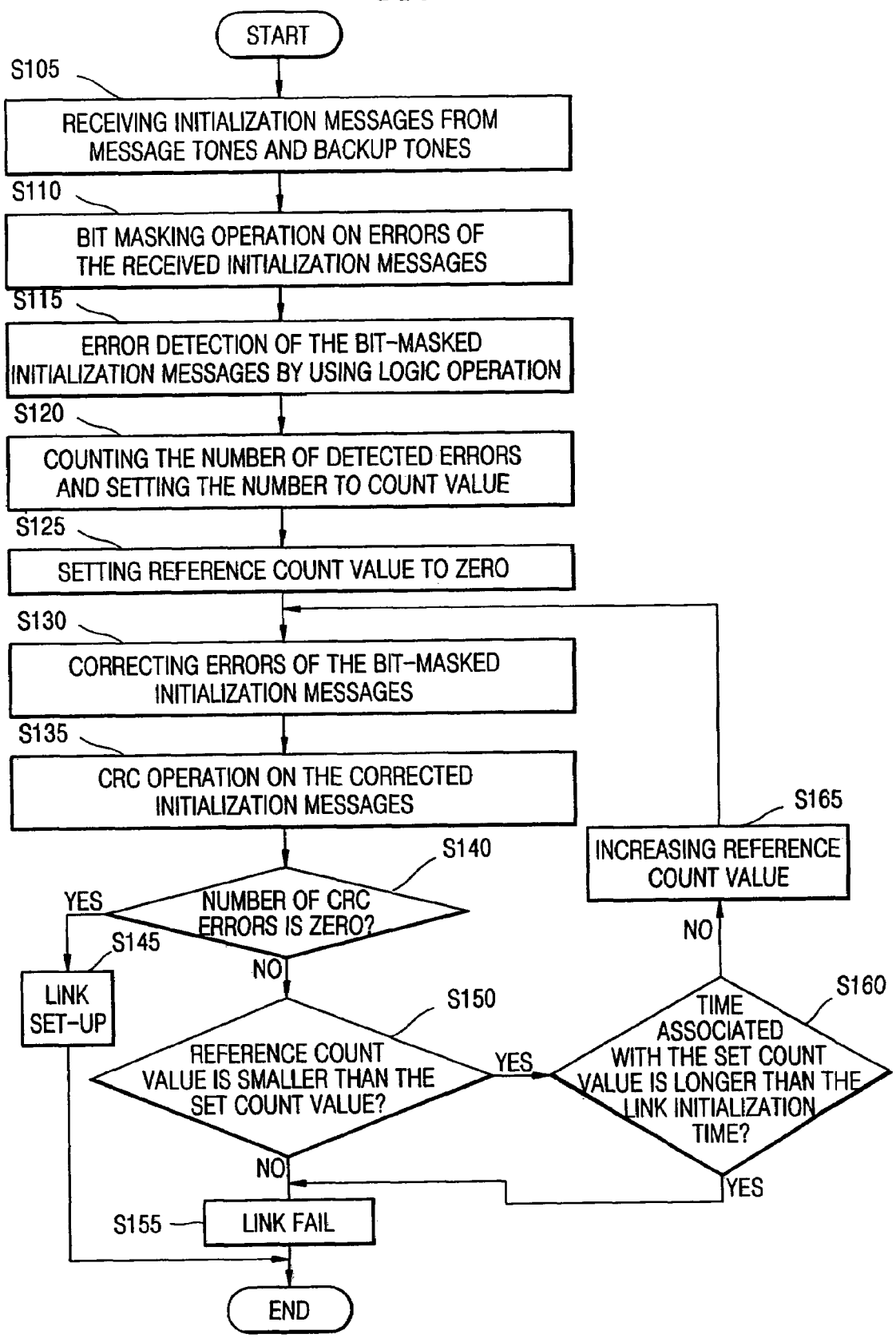
FIG. 5 is a flowchart illustrating a method of establishing a communication link in an ADSL system according to an embodiment of the present invention.

FIG. 5 is a flow diagram that illustrates a method of establishing a communication link in an asymmetric digital subscriber line (ADSL) system according to an embodiment of the present invention. The method of establishing a communication link in the ADSL system according to the embodiment of the present invention will be described based on a system that includes customer premises equipment (CPE) comprising an ADSL modem with reference to FIG. 5.

In a receiving step S105, initialization messages (for example, C_RATESRA, C_MSGRA, CRATES2, C_MSG2, and C_B&G) are received from message tones and backup tones corresponding to the message tones. The initialization messages of the message tones and the backup tones have the same values before being transmitted from a central office (CO) to the CPE. On the other hand, the data of the received initialization messages of the message tones and backup tones may contain differences in value, which are interpreted as errors that occur due to a crosstalk or noise.

In a bit masking step S110, a bit masking operation is performed on errors contained in the received messages. The bit masking step S110 will be described with reference to FIGS. 4 and 6.

The ADSL system to which the method of establishing the communication link according to the present invention is applied can transmit the initialization messages in one of a fast mode and an interleaved mode (sometimes referred to as a "slow mode"). In addition, the ADSL system can optionally transmit the initialization messages through a bearer channel. A transmitting procedure that utilizes one of the fast and interleaved modes is referred to as a "single latency" mode. In addition, the ADSL system to which the method of establishing the communication link according to the present invention is applied may transmit the initialization messages in a transmitting procedure referred to as a "double latency" mode using both the fast and interleaved modes. In addition, the ADSL system can optionally transmit the initialization messages through two or more bearer channels.

If the received initialization message (C_RATESRA in FIG. 4) is transmitted in the fast mode, information about all BI channels of the received initialization message (C_RATESRA in FIG. 4) must have a value of zero. In addition, information of the 7-th FS field of the RRSI fields must always have a value of zero. In BF channels of the received initialization messages, since only the AS0 bearer channel of the downstream channels is used and since only the LS0 bearer channel of the upstream channels is used, other bearer channels must always have a value of zero.

If the bit masking step S110 is performed on the initialization messages transmitted by the backup tones as shown in FIG. 4, four errors are removed, and only three errors remain. The result is shown in FIG. 6. FIG. 6 is a table illustrating transmitted/received messages generated when the bit masking step S110 according to the present invention is performed on the transmitted/received messages shown in FIG. 4.

In another embodiment, the bit masking step S110 may also optionally be performed on the initialization messages transmitted by the message tones as shown in FIG. 3 to remove errors thereof.

Accordingly, byte information reserved at the ITU-T is changed by the bit masking step S110 to have a value of zero, so that it is possible to reduce the probability of error occurrence in the subsequent cyclic redundancy check (CRC) operation.

In an error detection step S115, a predetermined logic operation is performed on the initialization messages of the message tones and the backup tones subjected to the bit masking step S110 in order to detect errors having different byte values in the initialization messages. The logic operation includes an exclusive OR operation.

In a count value setting step S120, the number of the errors detected by the logic operation is counted and a count value is set. For example, as shown in FIG. 6, if the number of errors is 3, the count value is set to 7. The count value of 7 represents three cases of one error being changed, three cases of two errors being changed, and one case of three errors being changed.

In a reference count value setting step S125, a reference count value to be compared with the set count value is set to 0.

In an error correction step S130, errors in one of the initialization messages of the message tones and the backup tones on which the bit masking step S110 is performed are corrected. As shown in FIG. 6, in a case where there are three errors, in the error correction step S130, at least one error can be changed.

Preferably, after the bit masking step S110 is performed on the initialization messages, the error correction step is performed on the initialization messages having a few errors. By performing the error correction step S130, it is possible to further reduce the probability of error occurrence in the subsequent cyclic redundancy check (CRC) operation.

In a cyclic redundancy check step S135, the cyclic redundancy check (CRC) operation is performed on the corrected initialization messages.

In a first determination step S140, it is determined whether or not the number of CRC errors is zero. If the number of the CRC errors is zero, the operation proceeds to a link set-up step S145, where it is asserted that a link is established in the ADSL system, and a decoding operation is performed on the initialization messages. If the number of the CRC errors is not zero, the procedure proceeds to a second determination step S150.

In the second determination step S150, it is determined whether or not the reference count value is smaller than the set count value. If the reference count value is determined to be not smaller than the set count value, the procedure proceeds to a link fail assertion step S155, where it is asserted that a link failure has occurred in the ADSL system, and that the link establishment procedure should be re-attempted. Returning to step S150, in the ADSL system in accordance with an actual test specification, when the reference count value is smaller than the set count value, the link establishment process is performed. Therefore, the operation does not proceed to the link fail assertion step S155 but instead proceeds to a third determination step S160.

In the third determination step S160, it is determined whether or not the time that has elapsed associated with the set count value is longer than a link initialization time. If the elapsed time associated with the set count value is longer than the link initialization time, the operation proceeds to the link fail determination step S155 and the link establishment process is once again initiated. If the set count value is not longer than the link initialization time, the operation proceeds to a reference count value increasing step S165.

In the reference count value increasing step S165, the reference count value is increased by one, and the operation returns to the error correction step S130.

In another embodiment of the present invention, though not shown in FIG. 5, the error detection step S115, the count value setting step S120, and the reference count value setting step S125 may be omitted in the method of establishing a communication link in the ADSL. In this embodiment, the error correction step S130 is performed immediately following the bit masking step S110.

FIG. 7 is a table that illustrates a test result obtained in a case where a method of establishing a communication link in an ADSL system according to the present invention is applied to test loops according to the ETSI 388 annex B test specification.

In the case where test loops according to ETSI 388 annex B test specification are tested using a conventional embodiment, without using the method of establishing a communication link according to the present invention, about 6 errors in the initialization messages occur due to crosstalk. The link failure occurs primarily due to errors induced by noise such as ETSI FA/FB crosstalk. In addition, the link failure occurs at the test loops operating at a low data rate of 512~1024 kbps. The test loops where the link failure occurs are listed at the shaded cells.

Referring to values listed in the shaded cells, in a case where the method of establishing a communication link according to the present invention is performed on the test loops where the link failure occurs and the test is performed again, it can be understood that the data rate of the test loops is faster than the data rate in the test specification. Accordingly, it is possible to stably perform the link establishment, or set-up, process by applying the method of establishing a communication link according to the present invention to the test loops in which the link failure occurs. For example, it is possible to readily perform the link establishment operation even in a case where the ETSI FA crosstalk is applied to the test loop 1 having a length of 2700 m.

While the present invention has been particularly shown and described with reference to exemplary embodiments thereof, it will be understood by those of ordinary skill in the art that various changes in form and detail may be made herein without departing from the spirit and scope of the present invention as defined by the following claims.

What is claimed is:

1. A method of establishing a communication link in an ADSL system using a bearer channel and latency mode when transmitting/receiving initialization messages and transmitting/receiving the initialization messages by using message tones and backup tones, the method comprising:
   (a) receiving the initialization messages from the message tones and the backup tones;
   (b) performing a bit masking operation on the initialization messages of the message tones and the backup tones to remove first errors thereof;
   (c) correcting second errors of one of the initialization messages of the message tones and the backup tones of which the first errors are bit-masked in the step (b);
   (d) performing a cyclic redundancy check operation on the initialization message having the corrected second errors to check for uncorrected second errors; and
   (e) determining link establishment or link failure of the communication link on which the initialization messages are transmitted based on the result of the cyclic redundancy check of the step (d).

2. The method according to claim 1, wherein the method further comprises a step (f), wherein, after performing the bit masking operation, detecting the second errors, the second errors having different byte values in the initialization messages in the message tones and the backup tones by performing a predetermined logic operation, and utilizing the number of the detected second errors as a repetition number of the cyclic redundancy check operation of the step (d).

3. The method according to claim 2, wherein the logic operation of the step (f) includes an exclusive-OR operation.

4. The method according to claim 2, wherein the errors in the step (b) occur due to a crosstalk or noise on the communication link.

5. The method according to claim 2, wherein, in a case where the number of the errors detected in the step (f) is 3, at least one error out of the three errors is changed by the error correction performed in the step (c).

6. The method according to claim 2, wherein the initialization messages corrected in the step (c) are initialization messages having a few errors.

7. The method according to claim 3, wherein the step (b) comprises a step of receiving the initialization message from the message tones and the backup tones.

8. The method according to claim 7, wherein the step (f) comprises:
   (f1) counting the number of the detected errors and setting the number to a count value; and
   (f2) setting a reference count value to zero.

9. The method according to claim 8, wherein the step (e) comprises:
   (e1) determining whether the number of the errors obtained by the cyclic redundancy check operation is zero;
   (e2) when the number of the errors obtained by the cyclic redundancy check operation is determined to be zero in the step (e1), asserting that there is a link establishment in the ADSL system;
   (e3) when the number of the errors obtained by the cyclic redundancy check operation is determined to be not zero in the step (e1), determining whether the reference count value is smaller than the set count value;
   (e4) when the reference count value is determined to be not smaller than the set count value in the step (e3), asserting that there is a link failure in the ADSL system;
   (e5) when the reference count value is determined to be smaller than the set count value in the step (e3), determining whether time associated with the set count value is longer than a link initialization time;
   (e6) when the time associated with the set count value is determined to be longer than the link initialization time in the step (e5), proceeding to the step (e4) to assert that there is a link failure in the ADSL system; and
   (e7) when the time associated with the set count value is determined to be not longer than the link initialization time in the step (e5), increasing the reference count value by one and providing the increased count value to the step (c).

* * * * *